US010248550B2

(12) United States Patent
Kadioglu et al.

(10) Patent No.: US 10,248,550 B2
(45) Date of Patent: Apr. 2, 2019

(54) SELECTING A SET OF TEST CONFIGURATIONS ASSOCIATED WITH A PARTICULAR COVERAGE STRENGTH USING A CONSTRAINT SOLVER

(71) Applicant: Oracle International Corporation, Redwood Shores, CA (US)

(72) Inventors: Serdar Kadioglu, Somerville, MA (US); Samir Sebbah, Medford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 18 days.

(21) Appl. No.: 15/715,145

(22) Filed: Sep. 25, 2017

(65) Prior Publication Data
US 2018/0173605 A1    Jun. 21, 2018

Related U.S. Application Data

(60) Provisional application No. 62/435,249, filed on Dec. 16, 2016.

(51) Int. Cl.
*G06F 9/44* (2018.01)
*G06F 11/36* (2006.01)
(52) U.S. Cl.
CPC ........ *G06F 11/368* (2013.01); *G06F 11/3672* (2013.01); *G06F 11/3688* (2013.01)
(58) Field of Classification Search
CPC . G06F 11/368; G06F 11/3688; G06F 11/3672
(Continued)

(56) References Cited

U.S. PATENT DOCUMENTS 5,542,043 A    7/1996 Cohen et al.
2002/0073380 A1*  6/2002 Cooke ................. G06F 17/5045
                                                    716/102
(Continued)

OTHER PUBLICATIONS

Tai and Lei, A test generation strategy for pairwise testing, IEEE transactions on software engineering, vol. 28, No. 1, Jan. 2002.
(Continued)

*Primary Examiner* — Chameli Das
(74) *Attorney, Agent, or Firm* — Invoke

(57) ABSTRACT

Techniques for selecting test configurations associated with a particular coverage strength using a constraint solver are disclosed. A set of parameters are configurable for conducting a test on a particular target application. A data model generator identifies one or more candidate test configurations based on the set of parameters. The data model generator determines a set of interactions based on a desired coverage strength. The data model generator specifies a selection variable indicating the candidate test configurations that are selected for testing the particular target application. The data model generator specifies constraint(s) minimizing the number of selected test configurations. The data model generator specifies constraint(s) requiring that each interaction be covered by at least one selected test configuration. The data model, including the selection variable and the constraints, are input to a constraint solver to obtain a set of selected test configurations associated with the desired coverage strength.

20 Claims, 5 Drawing Sheets

(58) Field of Classification Search
USPC .......................................................... 717/128
See application file for complete search history.

(56) References Cited

U.S. PATENT DOCUMENTS

| | | | | |
|---|---|---|---|---|
| 2003/0208744 | A1* | 11/2003 | Amir | G06F 11/3684 717/124 |
| 2007/0033576 | A1* | 2/2007 | Tillmann | G06F 11/3688 717/124 |
| 2009/0018793 | A1* | 1/2009 | Sakarovitch | G05B 13/024 702/123 |
| 2009/0125976 | A1* | 5/2009 | Wassermann | G06F 8/00 726/1 |
| 2013/0019126 | A1* | 1/2013 | Frohlich | G06F 11/3688 714/38.1 |
| 2013/0042222 | A1* | 2/2013 | Maddela | G06F 8/70 717/124 |
| 2013/0055029 | A1* | 2/2013 | Lawrance | G06F 11/3684 714/38.1 |
| 2014/0123110 | A1* | 5/2014 | Wan | G06F 11/3672 717/124 |
| 2015/0347282 | A1* | 12/2015 | Wingfors | G06F 11/3688 717/125 |
| 2016/0314065 | A1* | 10/2016 | Chirgwin | G06F 11/3672 |

OTHER PUBLICATIONS

Set cover problem, Wikipedia, https://en.wikipedia.org/wiki/Set_cover_problem, Feb. 23, 2018.
Kuhn et al., Combinatorial Software Testing, Software Technologies, Aug. 2009, pp. 94-96.
Hnich et al., Constraint-Based Approaches to the Covering Test Problem, Lecture Notes in Computer Science, Jun. 2004.
Hnich et al., Constraint Models for the Covering Test Problem, Constraints (2006) 11: 199-219, Springer Science + Business Media.
Column generation—Wikipedia, https://en.wikipedia.org/wiki/Column_generation, Mar 23, 2018.
Cohen et al., The AETG system: An Approach to Testing Based on Combinatorial Design, IEEE Transactions on Software Engineering, vol. 23, No. 7, Jul. 1997, pp. 437-444.

* cited by examiner

Table 300

| | Config (a) | Config (b) | Config (c) | Config (d) | | Config (h) | |
|---|---|---|---|---|---|---|---|
| Interaction (a) | 1 | 1 | 0 | 0 | | 0 | ← Example Coverage Array 322 |
| Interaction (b) | 0 | 0 | 1 | 1 | | 0 | |
| Interaction (c) | 0 | 0 | 0 | 0 | | 0 | |
| Interaction (d) | 0 | 0 | 0 | 0 | | 1 | |
| Interaction (e) | 1 | 0 | 0 | 0 | ••• | 0 | |
| Interaction (f) | 0 | 1 | 0 | 0 | | 0 | |
| Interaction (g) | 0 | 0 | 1 | 0 | | 0 | |
| Interaction (h) | 0 | 0 | 0 | 1 | | 1 | |
| Interaction (i) | 1 | 0 | 1 | 0 | | 0 | |
| Interaction (j) | 0 | 1 | 0 | 1 | | 0 | |
| Interaction (k) | 0 | 0 | 0 | 0 | | 0 | |
| Interaction (l) | 0 | 0 | 0 | 0 | | 1 | |

FIG. 3

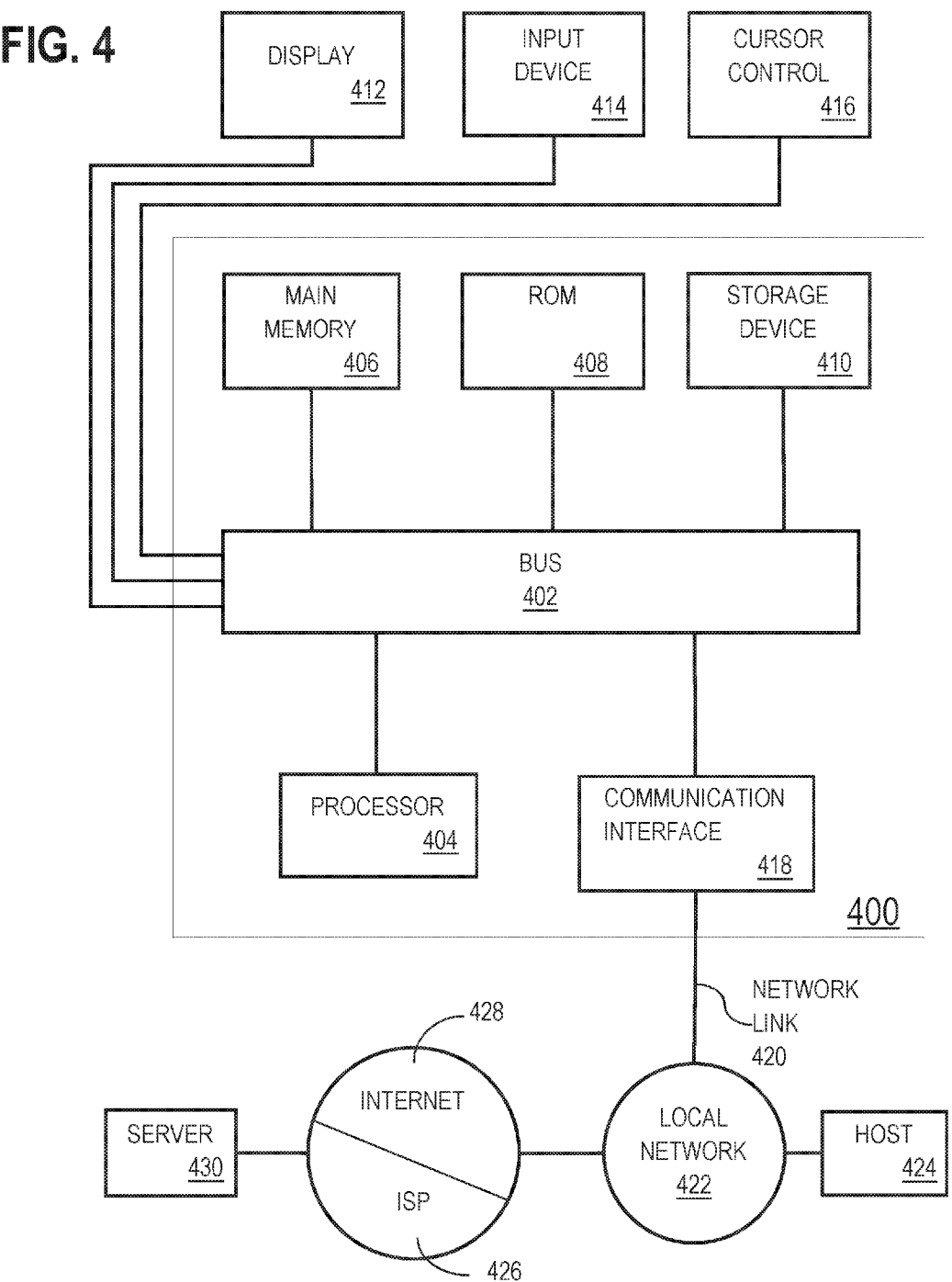

SELECTING A SET OF TEST CONFIGURATIONS ASSOCIATED WITH A PARTICULAR COVERAGE STRENGTH USING A CONSTRAINT SOLVER

BENEFIT CLAIMS; RELATED APPLICATIONS; INCORPORATION BY REFERENCE

This application claims the benefit of U.S. Provisional Patent Application 62/435,249, filed Dec. 16, 2016, which is hereby incorporated by reference.

TECHNICAL FIELD

The present disclosure relates to the use of constraint solvers. In particular, the present disclosure relates to selecting a set of test configurations associated with a particular coverage strength using a constraint solver.

BACKGROUND

Testing is an important part of quality assurance in software development, hardware design, and other industries. To ensure that a particular software application or hardware design functions properly under different environments, testing may be reiterated on the particular software application or hardware design using different test configurations. Each test configuration is associated with a set of parameters. Each time a test is executed on a particular software application or hardware design, different values are used for the set of parameters. As an example, test configurations used for software testing may be associated with the following parameters: an operating system (OS), a browser, a communications protocol, a central processing unit (CPU), and a database management system (DBMS). A target software application may be tested using a Windows OS, an Internet Explorer (IE) browser, an Internet Protocol version 4 (IPv4) protocol, an Intel CPU, and an Oracle DBMS. The target software application may be tested again using a Macintosh OS, a Firefox browser, an Internet Protocol version 6 (IPv6) protocol, an Advanced Micro Devices (AMD) CPU, and a MySQL DBMS. The target software application may be tested repeatedly using different test configurations. As another example, test configurations used for hardware testing may be associated with the following parameters: an input voltage, a temperature, a humidity, an input load, and an output load.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates an example of table showing relationships between candidate test configurations and interactions, in accordance with one or more embodiments; and FIG. 4 shows a block diagram that illustrates a computer system, in accordance with one or more embodiments.

DETAILED DESCRIPTION

Figure 1:
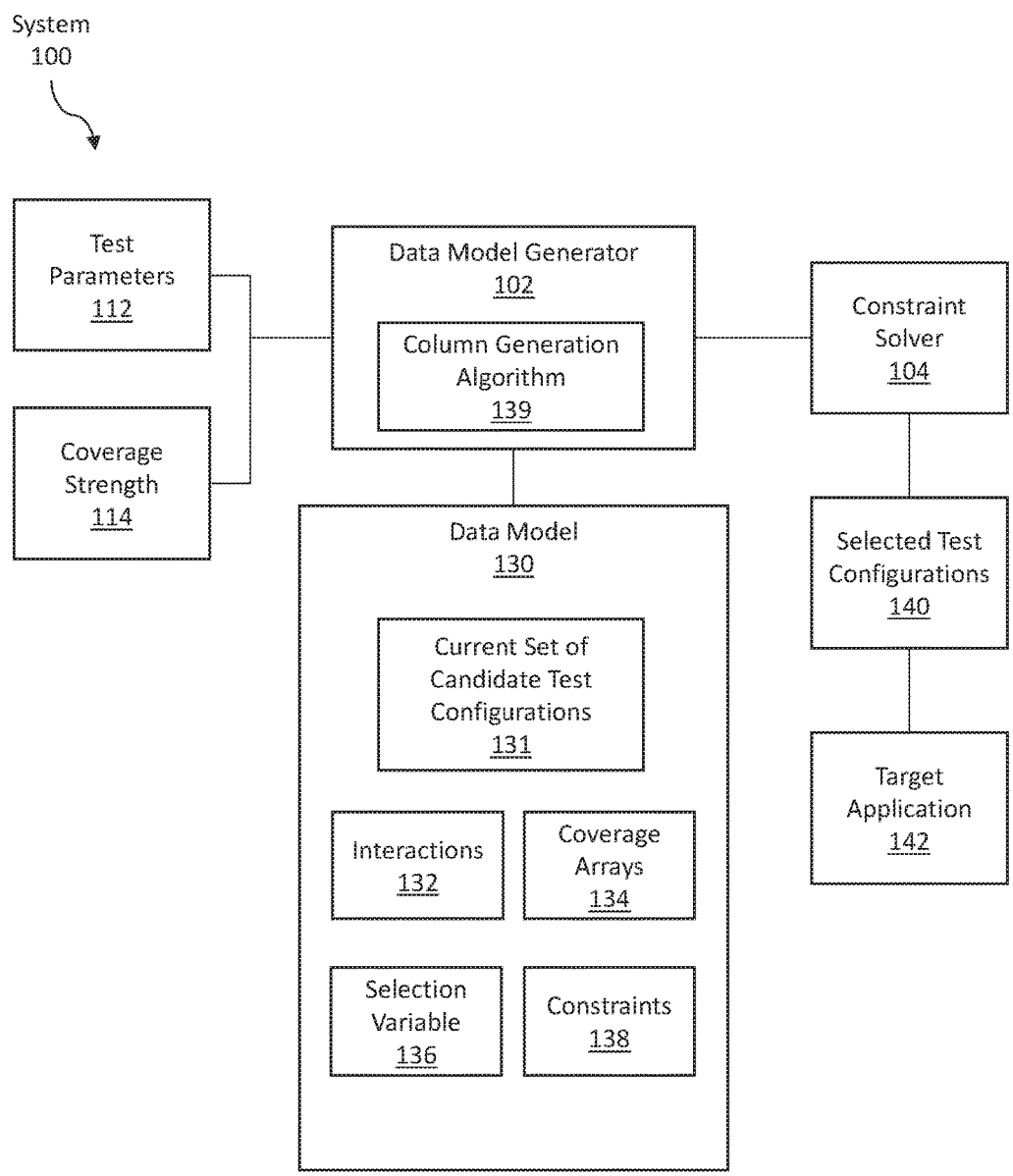
FIG. 1 illustrates an example of a data model generation system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DATA MODEL GENERATION SYSTEM ARCHITECTURE
3. GENERATING A DATA MODEL FOR APPLICATION TO A CONSTRAINT SOLVER FOR SELECTING A SET OF TEST CONFIGURATIONS ASSOCIATED WITH A PARTICULAR COVERAGE STRENGTH
4. MISCELLANEOUS; EXTENSIONS
5. HARDWARE OVERVIEW

1. General Overview

One or more embodiments relate to testing a target software and/or hardware application using multiple test configurations. Each test configuration is associated with a set of parameters. Each parameter may assume one of a limited set of candidate values.

A set of candidate test configurations covers every possible combination of values for the set of parameters. However, it may not be practical to test the particular software application using every candidate test configuration. The total number of candidate test configurations may be very large, due to a large number of parameters and/or a large number of candidate values that may be assumed by one or more parameters.

A user (such as a software developer) may specify a desired coverage strength for testing the target application. Based on the desired coverage strength, testing of the particular software application is ensured for every possible combination of values for only certain subgroups of the parameters. Specifically, the number of parameters in each subgroup of parameters is equal to the desired coverage strength. A particular combination of values for a subgroup of parameters may be referred to as an "interaction."

Since a single test configuration may cover multiple interactions, the desired coverage strength may be satisfied by testing the target application using less than the total number of candidate test configurations. Hence, testing the target application in a way that satisfies the desired coverage strength, rather than using every possible candidate test configuration, may be more practical and/or manageable.

One or more embodiments include generating a data model for application to a constraint solver for selecting a set of test configurations associated with a particular coverage strength. The data model may be used to select a minimum number of test configurations that satisfy the particular coverage strength. The problem of selecting the minimum number of test configurations that satisfy the particular coverage strength may be referred to as the "selection problem."

In an embodiment, a data model is generated for application to a constraint solver. Examples of constraint solvers include constraint programming solvers and mathematical programming solvers. The data model formulates the selection problem as a set of constraints for a solution to be found. Specifying a set of constraints for a solution to be found is a form of declarative programming. In contrast, specifying a sequence of steps for finding a solution is imperative programming. The number of constraints used in declarative programming is typically small when compared to the number of steps used in imperative programming. If there is a change to the parameters and/or candidate values of a parameter, a small number of constraints (rather than a large number of steps) need to be updated. Hence, the data model is highly scalable to adapt to various attributes of a selection problem.

In an embodiment, the data model includes a constraint that minimizes the number of selected test configurations. Additionally, the data model includes a constraint that requires each interaction to be covered by at least one selected test configuration.

One or more embodiments described in this Specification and/or recited in the claims may not be included in this General Overview section.

2. Data Model Generation System Architecture

FIG. 1 illustrates an example of a data model generation system, in accordance with one or more embodiments. The data model generation system is used for selecting test configurations that are used for testing a target application. As illustrated in FIG. 1, a system 100 includes a data model generator 102 and a constraint solver 104. The system 100 also includes one or more test parameters 112, and a coverage strength 114. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a target application 142 may include a program, component, device, machine, service and/or process. The target application 142 may be based on software, hardware, mechanics, bio-technology, and/or other technologies. The operation of the target application 142 may be different in different environments.

In one or more embodiments, a test parameter 112 is a configurable attribute of an environment used to test and/or execute a target application 142. A test parameter 112 is associated with a limited set of candidate values.

Examples of parameters used in testing software include but are not limited to an operating system (OS), a browser, a communications protocol, a central processing unit (CPU), and a database management system (DBMS). For example, candidate values for the OS parameter may include Windows and Macintosh. Candidate values for the browser parameter may include Internet Explorer (IE) and Firefox. Candidate values for the protocol parameter may include Internet Protocol version 4 (IPv4) and Internet Protocol version 6 (IPv6). Candidate values for the CPU parameter may include Intel and Advanced Micro Devices (AMD). Candidate values for the DBMS parameter may include Oracle and MySQL. Examples of parameters used in testing hardware include but are not limited to an input voltage, a temperature, a humidity, an input load, and an output load. Additional and/or alternative parameters may be used in testing other products or services.

A particular combination of values for a set of test parameters 112 may be referred to as a "test configuration." A list of every possible combination of values for the set of test parameters 112 may be referred to as a "complete set of candidate test configurations."

In one or more embodiments, a coverage strength 114 is a representation of the quality of test configurations that are selected for testing a target application 142. The test configurations that are selected may be only a subset of the complete set of candidate test configurations. A coverage strength 114 is satisfied if testing of the target application 142 is ensured for every possible combination of values for only certain subgroups of the parameters. Specifically, the number of parameters in each subgroup of parameters is equal to the coverage strength 114. A particular combination of values for a certain subgroup of parameters may be referred to as an "interaction," which is further described below. The coverage strength 114 may be obtained via a user interface and/or from another application.

Below is an example that illustrates the use of various terms, including "test parameter," "coverage strength," "complete set of candidate test configurations," and "interaction." As an example, an environment for testing a target application may be associated with three test parameters: OS, browser, and CPU. The candidate values for the OS may be: Windows and Macintosh. The candidate values for the browser may be: IE and Firefox. The candidate values for the CPU may be: Intel and AMD.

The complete set of candidate test configurations covers every possible combination of values for the set of test parameters. In this example, a complete set of candidate test configurations includes eight test configurations, as follows:
  (a) Windows, IE, and Intel;
  (b) Windows, IE, and AMD;
  (c) Windows, Firefox, Intel;
  (d) Windows, Firefox, AMD;
  (e) Macintosh, IE, and Intel;
  (f) Macintosh, IE, and AMD;
  (g) Macintosh, Firefox, and Intel;
  (h) Macintosh, Firefox, and AMD.

A user may specify a desired coverage strength of, for example, two. Hence, each subgroup of test parameters includes two test parameters. The subgroups of test parameters are:
  (a) OS and browser;
  (b) browser and CPU; and
  (c) OS and CPU.

The complete set of interactions, for the subgroups of test parameters, are:
  (a) Windows and IE;
  (b) Windows and Firefox;
  (c) Macintosh and IE;
  (d) Macintosh and Firefox;
  (e) IE and Intel;
  (f) IE and AMD;
  (g) Firefox and Intel;
  (h) Firefox and AMD;
  (i) Windows and Intel;
  (j) Windows and AMD;

(k) Macintosh and Intel;
(l) Macintosh and AMD.

In this example, in order to satisfy the coverage strength of two, test configurations for testing the target application must cover each of the interactions (a)-(l) at least once. The test configurations necessary for satisfying the coverage strength of two would be less than the complete set of test configurations.

In one or more embodiments, information describing test parameters 112 and/or a coverage strength 114 are stored in one or more data repositories (not illustrated). A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as a data model generator 102. Alternatively or additionally, a data repository may be implemented or executed on a computing system separate from a data model generator 102. A data repository 104 may be communicatively coupled to a data model generator 102 via a direct connection or via a network.

In one or more embodiments, a data model generator 102 refers to hardware and/or software configured to perform operations described herein for generating a data model 130, for application to a constraint solver 104, for selecting a set of test configurations 140 associated with a particular coverage strength 114. The data model 130 may be used to select a minimum number of test configurations 140 that satisfy the particular coverage strength 114. Examples of operations for generating the data model 130 are described below with reference to FIGS. 2A-2B.

In an embodiment, a data model generator 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, a data model 130 refers to a particular organization, structure, and/or representation of information. A data model 130 includes a current set of candidate test configurations 131, one or more interactions 132, one or more coverage arrays 134, a selection variable 136, and/or one or more constraints 138.

In one or more embodiments, a current set of candidate test configurations 131 may include the complete set of candidate test configurations 131, based on a certain set of test parameters 112 and corresponding candidate values for the test parameters 112. Alternatively, a current set of candidate test configurations 131 may include only a subset of the complete set of candidate test configurations 131. The subset of the complete set of candidate test configurations 131 is selected based on a column generation algorithm 139, which is further described below.

In one or more embodiments, an interaction 132 is a particular combination of values for a subgroup of test parameters, wherein the number of test parameters in the subgroup is equal to the coverage strength 114. A "complete set of interactions" 132, for a particular coverage strength 114, covers every combination of values for certain subgroups of parameters, wherein the number of test parameters in each subgroup is equal to the particular coverage strength 114.

In one or more embodiments, a coverage array 134 indicates which of the current set of candidate test configurations 131 cover a particular interaction 132. One coverage array 134 corresponds to each interaction 132. Each element in a coverage array 134 corresponds to a candidate test configuration 131. In an example, the elements of a coverage array 134 may assume the value "0" or the value "1." The value "0," in a particular element, may indicate that the candidate test configuration 131 corresponding to the particular element does not cover the interaction 132 corresponding to the coverage array 134. The value "1," in the particular element, may indicate that the candidate test configuration 131 corresponding to the particular element does cover the interaction 132 corresponding to the coverage array 134.

Referring back to the example above, the complete set of interactions is:
(a) Windows and IE;
(b) Windows and Firefox;
(c) Macintosh and IE;
(d) Macintosh and Firefox;
(e) IE and Intel;
(f) IE and AMD;
(g) Firefox and Intel;
(h) Firefox and AMD;
(i) Windows and Intel;
(j) Windows and AMD;
(k) Macintosh and Intel;
(l) Macintosh and AMD.

In this example, a separate coverage array corresponds to each interaction (a)-(l). Each element of a coverage array corresponds to each candidate test configuration (a)-(h). An element may assume the value of "1" to indicate that the corresponding candidate test configuration covers the corresponding interaction. The element may assume the value of "0" to indicate that the corresponding candidate test configuration does not cover the corresponding interaction.

For example, a coverage array corresponding to interaction (a) may be: [1, 1, 0, 0, 0, 0, 0, 0]. The first and second elements assume the value of "1" to indicate that candidate test configurations (a) and (b) cover interaction (a). Similarly, a coverage array corresponding to interaction (b) may be: [0, 0, 1, 1, 0, 0, 0, 0]. The third and fourth elements assume the value of "1" to indicate that candidate test configurations (c) and (d) cover interaction (b).

In one or more embodiments, a selection variable 136 indicates which of a current set of candidate test configurations 131 are selected for testing a target application 142. Specifically, each element of the selection variable 136 corresponds to one of the current set of candidate test configuration 131. Each element in the selection variable 136 indicates whether the candidate test configuration 131, corresponding to the element, is selected. As an example, a value of "1" may indicate that the corresponding candidate test configuration 131 has been selected. A value of "0" may indicate that the corresponding candidate test configuration 131 has not been selected. The candidate test configurations that have been selected may be referred to as "selected test configurations" 140.

Referring back to the example above, a complete set of candidate test configurations may be:
(a) Windows, IE, and Intel;
(b) Windows, IE, and AMD;

(c) Windows, Firefox, Intel;
(d) Windows, Firefox, AMD;
(e) Macintosh, IE, and Intel;
(f) Macintosh, IE, and AMD;
(g) Macintosh, Firefox, and Intel;
(h) Macintosh, Firefox, and AMD.

A selection variable may be: [1, 0, 0, 1, 0, 1, 1, 0]. The selection variable indicates that test configurations (a), (d), (f), and (g) are selected.

In one or more embodiments, a constraint 138 is a property required for a solution of the selection problem. In an embodiment, a data model 130 includes two constraints. One constraint minimizes the cost of testing a target application 142 using the selected test configurations 140. In some cases, minimizing the cost of testing the target application 142 using the selected test configurations 140 may include minimizing the number of selected test configurations 140. Another constraint requires that each interaction 132 be covered by at least one selected test configuration 140.

In one or more embodiments, a data model generator 102 may apply a column generation algorithm 139. A column generation algorithm 139 is an algorithm that guides a constraint solver 104 in the process of determining a solution to the selection problem. Initially, the selection problem is divided into a master problem and one or more subproblems. The master problem includes only a subset of the complete set of candidate test configurations. The master problem is the current set of candidate test configurations 131. The constraint solver determines a solution for only the current set of candidate test configurations 131. Based on whether the solution is optimal, additional candidate test configurations are added to the current set of candidate test configurations 131. The constraint solver again determines a solution for the current set of candidate test configurations 131. The constraint solver 104 stops the iterative process when the solution cannot be further improved, for example, when the number of selected test configurations 140 cannot be further reduced while satisfying the coverage strength 114. One example of a column generation algorithm 139 is Dantzig-Wolfe decomposition.

In one or more embodiments, a data model 130 may be implemented as a software data structure. The software data structure is readable by a machine. The software data structure may be an input parameter into a hardware and/or software component, such as a constraint solver 104. Interactions 132, coverage arrays 134, and/or a selection variable 136 are implemented as data structure elements within the software data structure. Examples of data structure elements include an array, a vector, a linked list, a table, a software variable, a constant, and/or other software data objects.

In one or more embodiments, a constraint solver 104 refers to hardware and/or software configured to perform operations described herein for returning a set of selected test configurations 140 based on a data model 130. The set of selected test configurations 140 include a minimum number of test configurations that cover each interaction 132 at least once. The input to the constraint solver 140 includes one or more constraints 138, expressed in the form of declarative programming. Examples of constraint solvers 104 include a constraint programming solver and a mathematical programming solver. A constraint solver 104 may be configured to apply constraint programming algorithms well-known in the art, such as backtracking and forward checking. A constraint solver 104 may be implemented on one or more digital devices. A data model generator 102 and a constraint solver 104 may be implemented on a same digital device or different digital devices.

Figure 2A:
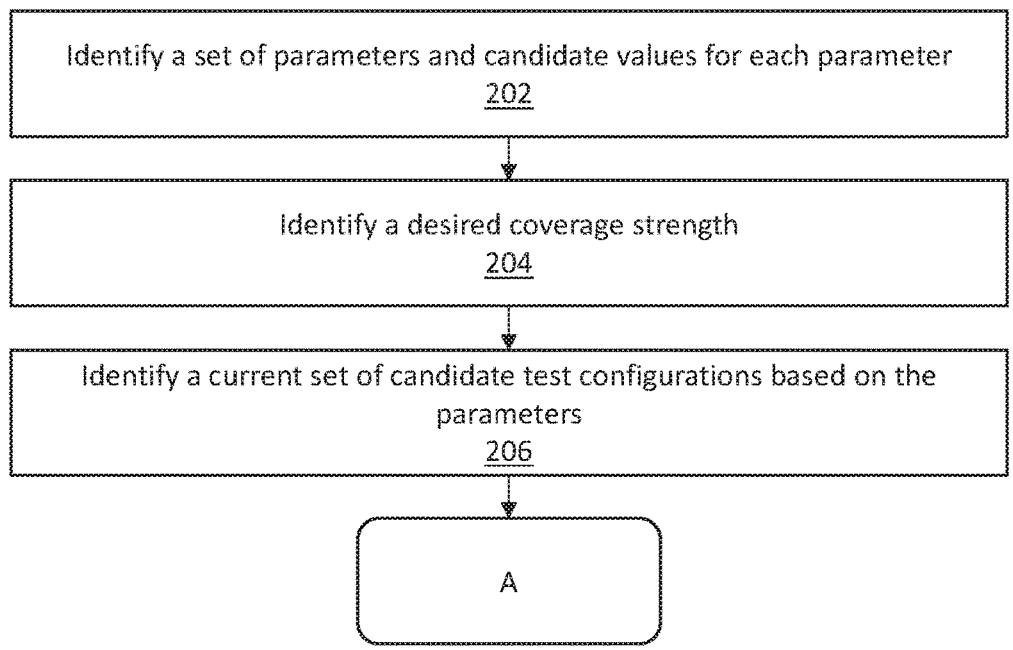
FIGS. 2A-2B illustrate an example set of operations for generating a data model for application to a constraint solver for selecting a set of test configurations associated with a particular coverage strength, in accordance with one or more embodiments.
Figure 2B:
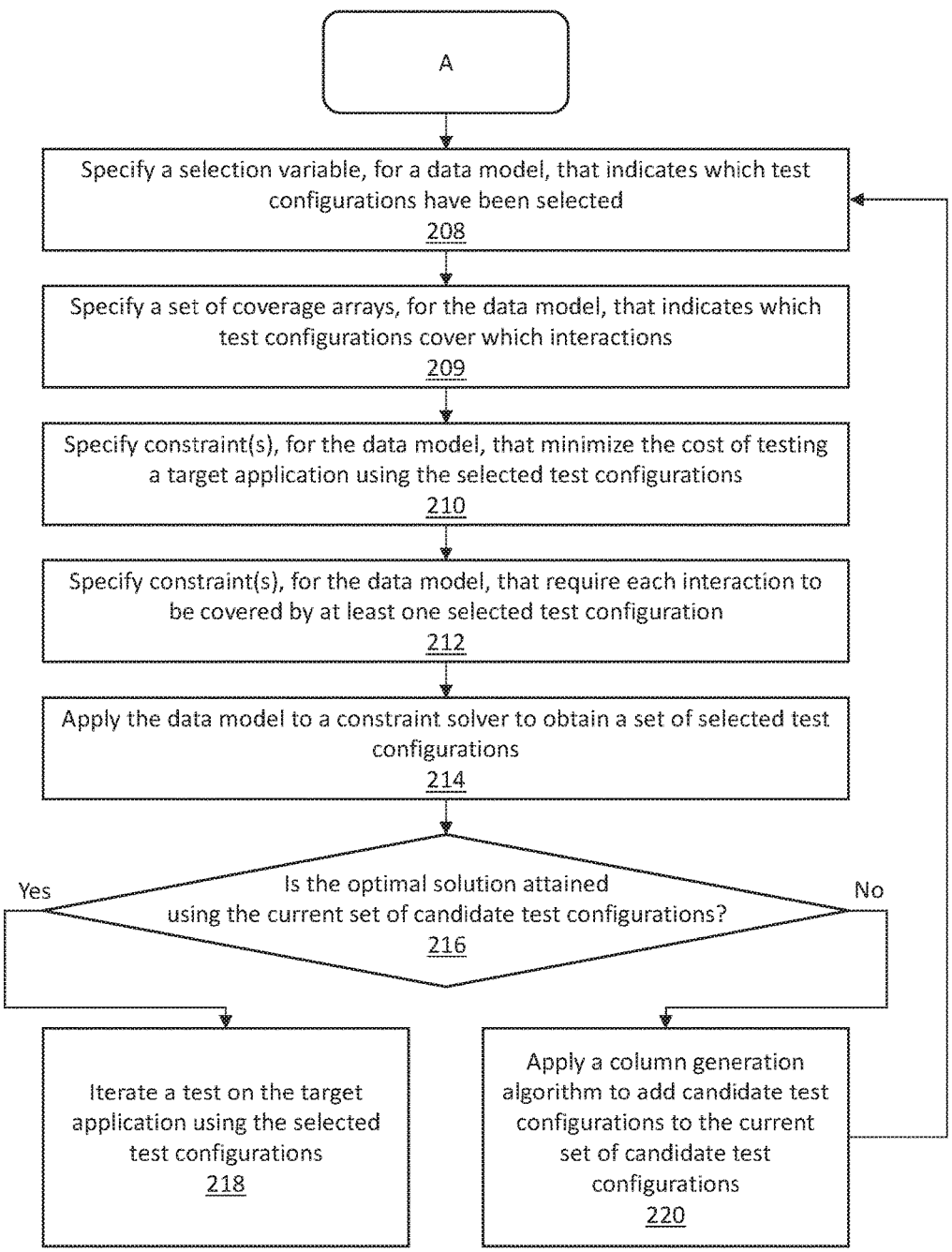

3. Generating a Data Model for Application to a Constraint Solver for Selecting a Set of Test Configurations Associated with a Particular Coverage Strength FIGS. 2A-2B illustrate an example set of operations for generating a data model, for application to a constraint solver, for selecting a set of test configurations associated with a particular coverage strength, in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

One or more embodiments include identifying a set of parameters and candidate values for each parameter (Operation 202). A data model generator 102 obtains the parameters and the candidate values via a user interface and/or from another application.

One or more embodiments include identifying a desired coverage strength (Operation 204). The data model generator 102 obtains the desired coverage strength via a user interface and/or from another application.

One or more embodiments include identifying a current set of candidate test configurations based on the parameters (Operation 206).

In an embodiment, the data model generator 102 selects the complete set of candidate test configurations as the current set of candidate test configurations. As described above, the complete set of candidate test configurations covers every possible combination of values for the set of parameters. In this case, there is no need to apply a column generation algorithm, as discussed below with reference to Operation 216.

As an example, a set of parameters may be: OS, browser, and CPU. The candidate values for the OS may be: Windows and Macintosh. The candidate values for the browser may be: IE and Firefox. The candidate values for the CPU may be: Intel and AMD. Based on the set of parameters and the candidate values, the complete set of candidate test configurations are:
(a) Windows, IE, and Intel;
(b) Windows, IE, and AMD;
(c) Windows, Firefox, Intel;
(d) Windows, Firefox, AMD;
(e) Macintosh, IE, and Intel;
(f) Macintosh, IE, and AMD;
(g) Macintosh, Firefox, and Intel;
(h) Macintosh, Firefox, and AMD.

In an embodiment, a data model generator 102 may identify only a subset of the complete set of candidate test configurations for inclusion in a data model. The initial subset of candidate test configurations (also referred to as the "master problem") may be selected based on user input and/or another application. Additionally or alternatively, the number of candidate test configurations to be included in the master problem may be specified based on user input and/or another application. The data model generator 102 may use a column generation algorithm, as described below with reference to Operation 216, to identify additional candidate test configurations to be included in the data model.

One or more embodiments include specifying a selection variable, for a data model, that indicates which test configurations have been selected (Operation 208). The data model generator 102 specifies a selection variable. The selection variable indicates which of the current set of candidate test configurations, identified at Operation 206, have been selected. The number of elements in the selection variable is equal to the number of candidate test configurations identified at Operation 206. Each element of the selection variable corresponds to one of the current set of candidate test configuration. Each element may assume one of two values, indicating whether or not the corresponding candidate test configuration has been selected.

One or more embodiments include specifying a set of coverage arrays, for the data model, that indicates which test configurations cover which interactions (Operation 209). The data model generator 102 specifies a set of coverage arrays. Each coverage array corresponds to one of a set of interactions. The set of interactions are determined based on the set of parameters, the candidate values for each parameter, and the desired coverage strength, which were identified at Operations 202-204.

Referring back to the example above, a set of parameters may be: OS, browser, and CPU. As described above, there may be eight test configurations (a)-(h). A user may specify a desired coverage strength of, for example, two. Hence, each subgroup of test parameters includes two test parameters. The subgroups of test parameters are:
(a) OS and browser;
(b) browser and CPU; and
(c) OS and CPU.

The complete set of interactions, for the subgroups of test parameters, are:
(a) Windows and IE;
(b) Windows and Firefox;
(c) Macintosh and IE;
(d) Macintosh and Firefox;
(e) IE and Intel;
(f) IE and AMD;
(g) Firefox and Intel;
(h) Firefox and AMD;
(i) Windows and Intel;
(j) Windows and AMD;
(k) Macintosh and Intel;
(l) Macintosh and AMD.

In this example, a data model generator specifies one coverage array corresponding to each interaction (a)-(l). Each element of a coverage array corresponds to each test configuration (a)-(h).

The coverage arrays and candidate test configurations may be visualized using a number of rows and columns. Referring back to the example above, there may be eight candidate test configurations (a)-(h) and twelve interactions (a)-(l). As illustrated in FIG. 3, table 300 includes a number of rows and columns. Each coverage array, respectively corresponding to interactions (a)-(l), forms a row. Each test configuration (a)-(h) forms a column.

The first coverage array (e.g., example coverage array 322) corresponds to interaction (a). The data model generator 102 may determine whether candidate test configuration (a) covers interaction (a). Candidate test configuration (a) covers interaction (a) if candidate test configuration (a) and interaction (a) have the same values for the subgroup of parameters. In this case, candidate test configuration (a) and interaction (a) have the same value "Windows" for the OS parameter. Candidate test configuration (a) and interaction (a) have the same value "IE" for the browser parameter. Hence, candidate test configuration (a) covers interaction (a). Since candidate test configuration (a) covers interaction (a), the data model generator may determine that the first element, corresponding to candidate test configuration (a), of the first coverage array has a value of "1."

Next, the data model generator 102 may determine whether candidate test configuration (b) covers interaction (a). Candidate test configuration (b) and interaction (a) have the same value "Windows" for the OS parameter. Candidate test configuration (b) and interaction (a) have the same value "IE" for the browser parameter. Hence, the data model generator may determine that the second element, corresponding to candidate test configuration (b), of the first coverage array has a value of "1."

Next, the data model generator 102 may determine whether candidate test configuration (c) covers interaction (a). Candidate test configuration (c) has the value "Firefox" for the browser parameter, while interaction (a) has the value "IE" for the browser parameter. Since the values for the browser parameter are different, candidate test configuration (c) does not cover interaction (a). The data model generator 102 may determine that the third element, corresponding to candidate test configuration (c), of the first coverage array has a value of "0."

Similarly, the data model generator 102 may iterate through all candidate test configurations with respect to interaction (a). By iterating through all candidate test configurations with respect to interaction (a), the data model generator 102 may specify every element of the first coverage array. The data model generator 102 may determine that the first coverage array is [1, 1, 0, 0, 0, 0, 0, 0].

The data model generator 102 may repeat the process for each interaction in order to specify each corresponding coverage array. For this example, portions of the coverage arrays are as illustrated in FIG. 3.

One or more embodiments include specifying one or more constraints, for the data model, that minimize the cost of testing a target application using the selected test configurations (Operation 210). The data model generator 102 obtains the cost of testing the target application using each candidate test configuration identified at Operation 206. The data model generator 102 obtains the costs via user input and/or another application. The cost of testing the target application using each test configuration may be the same or different.

As an example, one test configuration may be associated with a high-speed CPU. Another test configuration may be associated with a low-speed CPU. Test results may be determined in a shorter time period using the high-speed CPU than using the low-speed CPU. Hence, the cost of testing a target application using the high-speed CPU may be lower than the cost of testing the target application using the low-speed CPU. User input may specify a particular cost for testing the target application using a high-speed CPU, and another cost for testing the target application using a low-speed CPU.

In an embodiment, the cost of testing a target application using a particular test configuration may be based on the desirability of testing the target application using the particular test configuration. A user (e.g., a software developer) may desire to use a particular test configuration more than another test configuration for a variety of reasons.

The user may prefer to use the particular test configuration over other test configurations because the particular test configuration is known to have more problems than other test configurations. As an example, a set of parameters may be: OS, browser, and CPU. The candidate values for the browser may be: IE and Firefox. IE may be known to generate more bugs than Firefox. Hence, a user may desire any test configurations that include IE, rather than Firefox, in order to focus on resolving problems caused by IE. The user may specify that the cost of test configurations including IE are lower than test configurations not including IE, in order to favor test configurations including IE.

The user may prefer to use the particular test configuration over other test configurations because the particular test configuration is known to be associated with more customers and/or clients. As an example, a set of parameters may be: OS, browser, and CPU. The candidate values for the browser may be: IE and Firefox. IE may be known to have more end users than Firefox. Hence, a user may desire any test configurations that include IE, rather than Firefox, in order to focus on testing the target application in an environment that is most popular amongst end users. The user may specify that the cost of test configurations including IE are lower than test configurations not including IE, in order to favor test configurations including IE.

Alternatively or alternatively, a user may disfavor using a particular test configuration more than another test configuration. The user may disfavor the particular test configuration because it includes an invalid combination of values for the set of parameters. As an example, a set of parameters may be: OS, browser, and CPU. The candidate values for OS may be: Windows and Macintosh. The candidate values for the browser may be: IE and Safari. It may be impossible to execute Safari on a Windows OS. Hence, a user may disfavor any test configurations that include both Windows and Safari, in order to avoid selecting test configurations that are impossible to implement in a testing environment. The user may specify that the cost of test configurations including both Windows and Safari are higher than other test configurations, in order to disfavor test configurations including both Windows and Safari.

Based on information indicating the cost of each test configuration, the data model generator 102 specifies a cost array. Each element of the cost array corresponds to a candidate test configuration. An element of the cost array stores the cost of testing the target application using the corresponding candidate test configuration.

The data model generator 102 specifies the total cost of testing the target application using the selected test configurations as the dot product of the cost array and the selection variable. The data model generator 102 specifies a constraint applying a min function to the total cost. The min function directs the constraint solver to find a solution that minimizes the total cost. Expressed as a formula, the constraint may be written as:

$$\min \sum_{i=0}^{N} c_i x_i$$

wherein $c_i$ is the cost of testing the target application using the ith candidate test configuration, $x_i$ represents whether the ith candidate test configuration has been selected, and N is the total number of candidate test configurations in the current set of candidate test configurations. The value of $x_i$ may be "1" if the ith candidate test configuration has been selected, while the value of $x_i$ may be "0" if the ith candidate test configuration has not been selected.

In an embodiment, the cost of testing the target application using the selected test configurations is minimized by minimizing the number of selected test configurations. In this case, the cost of testing the target application using each test configuration is considered to be the same. Referring to the formula above, $c_i$ is set to a value of "1" for every i. Hence, the constraint may be written as a summation of the values assumed by the elements of the selection variable:

$$\min \sum_{i=0}^{N} x_i$$

One or more embodiments include specifying one or more constraints, for the data model, that require each interaction to be covered by at least one selected test configuration (Operation 212). Referring back to FIG. 3, the constraints may be visualized as requiring that there is at least one "1" in each row for the subset of columns corresponding to selected test configurations. The constraints may also be expressed as requiring that the sum across each row, for the subset of columns corresponding to selected test configurations, is equal to or greater than one.

In an embodiment, the data model generator 102 determines a total number of times that a particular interaction is covered by the selected test configurations. The total number of times that a particular interaction is covered by the selected test configuration is computed as the dot product of the coverage array, corresponding to the particular interaction, and the selection variable. The data model generator 102 specifies a constraint requiring the total number of times that the particular interaction is covered by the selected test configurations to be equal to or greater than one. Expressed as a formula, the constraint may be written as:

$$\sum_{i=0}^{N} p_i x_i \geq 1$$

wherein $p_i$ represents whether the ith candidate test configuration covers the particular interaction, $x_i$ represents whether the ith candidate test configuration has been selected, and N is the total number of candidate test configurations in the current set of candidate test configurations. The value of $x_i$ is "1" if the ith candidate test configuration has been selected, while the value of $x_i$ is "0" if the ith candidate test configuration has not been selected. The value of $p_i$ is "1" if the ith candidate test configuration covers the particular interaction, while the value of $p_i$ is "0" if the ith candidate test configuration does not cover the particular interaction.

The data model generator 102 repeats the process to determine a total number of times that each interaction is covered by the selected test configurations. The data model generator 102 specifies a constraint corresponding to each interaction. Hence, the data model generator 102 specifies a set of constraints, including, for example:

$\sum_{i=0}^{N} p_{a,i} x_i \geq 1$, wherein $p_a$ is the coverage array corresponding to interaction (a);

$\sum_{i=0}^{N} p_{b,i} x_i \geq 1$, wherein $p_b$ is the coverage array corresponding to interaction (b);

$\sum_{i=0}^{N} p_{c,i} x_i \geq 1$, wherein $p_c$ is the coverage array corresponding to interaction (c).

One or more embodiments include applying the data model to a constraint solver to obtain a set of selected test configurations (Operation 214). The data model generator 102 inputs the data model as a parameter to the constraint solver.

The data model includes the selection variable and the set of coverage arrays. Additional and/or alternative variables and/or data structures may be included.

The data model includes one or more of the constraints specified at Operations 210-212. Additional and/or alternative constraints may be included.

The constraint solver may be configured to apply one or more constraint programming algorithms that are well-known in the art. Constraint programming algorithms well-known in the art include, for example, backtracking and forward-checking algorithms.

A constraint solver may process each element of the selection variable to find a valid solution to the selection problem. Each element of the selection variable may assume either a first value or a second value. The first value is temporarily assumed by the current element of the selection variable. If this assumption violates at least one of the constraints included in the data model, then the second value is temporarily assumed by the current element. If this assumption also violates at least one of the constraints, then a re-assignment of a previous element of the selection variable is made.

A particular value had been temporarily assumed by the previous element of the selection variable. Based on the need for re-assignment, another value is temporarily assumed by the previous element. Then, assignment of the current element is reattempted.

The constraint solver iterates through each element of the selection variable, until each element assumes either the first value or the second value, without violating the constraints included in the data model. The temporary assignments are determined to be final assignments. The final assignments are returned as a valid solution to the selection problem. Based on the returned solution, a testing application determines a subset of the candidate test configurations that are selected.

Optionally, one or more embodiments include determining whether the optimal solution is attained using the current set of candidate test configurations (Operation 216). If the current set of candidate test configurations, identified at Operation 206, includes the complete set of candidate test configurations, then there is no need to perform Operation 216. Operation 218 may be performed.

If adding one or more candidate test configurations to the current set of candidate test configurations would improve the solution found at Operation 214, then the optimal solution has not been attained. On the other hand, if adding one or more candidate test configurations to the current set of candidate test configurations would not improve the solution found at Operation 214, then the optimal solution has been attained. Whether the optimal solution has been attained may be determined using well-known methods associated with the column generation algorithm.

Alternatively, one or more embodiments include determining whether a satisfactory solution is attained using the current set of candidate test configurations. What is considered a satisfactory solution may be determined based on user input and/or another application. As an example, a satisfactory solution may be a solution that includes a maximum number of selected test configurations. As another example, a satisfactory solution may include only a certain percentage of complete set of candidate test configurations.

One or more embodiments include appying a column generation algorithm to add candidate test configurations to the current set of candidate test configurations (Operation 220). The column generation algorithm is used to select additional candidate test configurations to be added to the current set of candidate test configurations. The number of candidate test configurations to be added and/or the specific candidate test configurations to be added may be specified based on user input and/or another application.

Based on the current set of candidate test configurations (now including the newly added candidate test configurations), the data model generator 102 again specifies a selection variable and a set of coverage arrays, as described above with reference to Operations 208-209. The data model generator 102 again specifies a set of constraints, as described above with reference to Operations 210-212. The data model generator 102 again applies the data model (with the new selection variable, the new coverage arrays, and the new constraints) to the constraint solver, as described above with reference to Operation 214. The constraint solver is iterated multiple times based on the column generation algorithm. The process stops when the column generation alogirthm determines that an optimal solution has been achieved. An optional solution is achieved if, for example, a minimum number of test configurations are selected for achieving a desired coverage strength.

Referring again to FIG. 3, the column generation algorithm may be visualized as follows. Initially, the current set of candidate test configurations may include only candidate test configurations (a)-(c). Each coverage array, corresponding to interactions (a)-(l), may include three elements only. The data model may include candidate test configurations (a)-(c), and the coverage arrays with three elements each. The constraint solver may solve the problem based on the data model. If the optimal solution is not attained, then candidate test configuration (d) may be added. The current set of candidate test configurations now includes test configurations (a)-(d). Each coverage array, corresponding to interactions (a)-(l), may now include four elements. The new data model may include candidate test configurations (a)-(d), and the coverage arrays with four elements. The constraint solver may again solve the problem based on the data model. Additional columns are iteratively added, and the process is repeated until the optimal solution is attained.

In an embodiment, a column generation algorithm starts with a current set of candidate test configurations that includes a "wildcard test configuration." The wildcard test configuration may hypothetically cover a large number of interactions, so large that the wildcare test configuration does not correspond to any real test configurations. Meanwhile, the cost assigned to the wildcard test configuration may be so high that the wildcard test configuration is not selected. Referring back to FIG. 3, for example, the wildcard configuration may be the first column in the table. There may be a "1" in every row of the first column. There is no real test configuration that covers every interaction (a)-(l).

When the data model including the wildcard test configuration is applied to a constraint solver, the constraint solver may find that the wildcard test configuration satisfies the constraint requiring that each interaction be covered by at least one selected test configuration. However, the constraint solver may find that the cost of using the selected test configurations is not minimized, due to the high cost hypothetically associated with the wildcard test configuration. Based on the column generation algorithm, new candidate test configurations may be added to the current set of candidate test configurations. The constraint solver may be applied again to the new data model. The process is iterated, as described above, until an optimal solution is attained.

One or more embodiments include iterating a test on the target application using the selected test configurations (Operation 218). The testing application conducts a test on the target application using the first test configuration of the selected test configurations. The testing application conducts the test on the target application using the second test configuration of the selected test configurations. Similarly, the testing application conducts the test on the target application using each of the selected test configurations. Test results are gathered based on each test. The testing application does not conduct the test on the target application using any non-selected test configurations.

The number of selected test configurations is less than the number of candidate test configurations in the complete set of candidate test configurations. Using the selected test configurations, rather than the complete set of candidate test configurations, the number of times that the test is iterated on the target application is reduced. Meanwhile, conducting the test using only the selected test configurations still guarantees that the target application is tested for every combination of values for certain subgroups of parameters. The number of parameters in each subgroup is equal to the desired coverage strength.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

What is claimed is:

1. A non-transitory computer readable medium comprising instructions which, when executed by one or more hardware processors, causes performance of a set of operations, comprising:
   identifying a set of test parameters for testing a target application;
   identifying, for each test parameter of the set of test parameters, a respective set of candidate values for the test parameter;
   identifying a set of candidate test configurations, each associated with a respective combination of candidate values for the set of test parameters;
   identifying a desired coverage strength;
   identifying subgroups of test parameters, from the set of test parameters, each of the subgroups of test parameters including a number of test parameters that is equal to the desired coverage strength;
   identifying a set of interactions, wherein:
      each interaction is associated with one of the subgroups of test parameters;
      each interaction is associated with a respective combination of candidate values for the associated subgroup of test parameters; and
      the set of interactions covers every possible combination of candidate values for each of the subgroups of parameters;
   specifying a selection variable, indicating which of the set of candidate test configurations have been selected;
   specifying a set of one or more constraints that:
      minimizes a cost of testing the target application using a subset of the set of candidate test configurations that is selected based on the selection variable; and
      requires each of the set of interactions to be covered by at least one of the subset of the set of candidate test configurations that is selected based on the selection variable;
   storing a data model, applicable to a constraint solver, comprising:
      the selection variable; and
      the set of constraints;
   wherein the target application is executed using at least one of the subset of the set of candidate test configurations that is selected based on the selection variable.

2. The medium of claim 1, wherein:
   the operations further comprise: specifying a plurality of coverage variables, wherein each of the plurality of coverage variables respectively corresponds to the set of interactions, and each of the plurality of coverage variables indicates which of the set of candidate test configurations cover the corresponding interaction; and
   specifying the set of one or more constraints comprises:
      requiring that the dot product of (a) the selection variable and (b) each of the plurality of coverage variables be equal to or greater than one.

3. The medium of claim 1, wherein:
   the operations further comprise: obtaining a cost variable, indicating a cost associated with each of the set of candidate test configurations; and
   the set of one or more constraints comprises: minimizing the dot product of (a) the selection variable and (b) the cost variable.

4. The medium of claim 1, wherein:
   the selection variable comprises a set of elements, respectively corresponding to the set of candidate test configurations, wherein each of the set of elements assumes a first value if the corresponding candidate test configuration is selected or assumes a second value if the corresponding candidate test configuration is not selected; and the set of one or more constraints comprises: minimizing the summation of values assumed by the set of elements of the selection variable.

5. The medium of claim 1, wherein the constraint solver comprises at least one of: a constraint programming solver and a mathematical programming solver.

6. The medium of claim 1, wherein the set of candidate test configurations covers every possible combination of candidate values for the set of parameters.

7. The medium of claim 1, wherein the set of candidate test configurations is only a subset of a complete set of candidate test configurations that covers every possible combination of candidate values for the set of parameters.

8. The medium of claim 1, wherein the operations further comprise:

selecting one or more additional candidate test configurations, which were not included in the set of candidate test configurations, based on a column generation method; and storing a new data model, applicable to the constraint solver, based on both (a) the set of candidate test configurations and (b) the additional candidate test configurations.

9. The medium of claim 1, wherein the set of candidate test configurations includes a particular test configuration, and the plurality of coverage variables indicates that the particular test configuration covers every interaction.

10. The medium of claim 1, wherein:

executing the target application using a first candidate test configuration, of the set of candidate test configurations, is completed in a shorter duration of time than executing the target application using a second candidate test configuration, of the set of candidate test configurations;

the operations further comprise: obtaining a cost corresponding to each of the set of candidate test configurations, wherein a first cost corresponding to the first candidate test configuration is less than a second cost corresponding to the second candidate test configuration.

11. The medium of claim 1, wherein:

a first candidate test configuration, of the set of candidate test configurations, is associated with a larger number of known problems than a second candidate test configuration, of the set of candidate test configurations;

the operations further comprise: obtaining a cost corresponding to each of the set of candidate test configurations, wherein a first cost corresponding to the first candidate test configuration is less than a second cost corresponding to the second candidate test configuration.

12. The medium of claim 1, wherein:

a first candidate test configuration, of the set of candidate test configurations, is associated with a larger number of end users than a second candidate test configuration, of the set of candidate test configurations;

the operations further comprise: obtaining a cost corresponding to each of the set of candidate test configurations, wherein a first cost corresponding to the first candidate test configuration is less than a second cost corresponding to the second candidate test configuration.

13. The medium of claim 1, wherein:

a first candidate test configuration, of the set of candidate test configurations, is associated with an invalid combination of candidate values for the set of parameters;

a second candidate test configuration, of the set of candidate test configurations, is associated with a valid combination of candidate values for the set of parameters;

the operations further comprise: obtaining a cost corresponding to each of the set of candidate test configurations, wherein a first cost corresponding to the first candidate test configuration is greater than a second cost corresponding to the second candidate test configuration.

14. The medium of claim 1, wherein the operations further comprise:

applying the data model to the constraint solver.

15. The medium of claim 1, wherein the operations further comprise:

iterating a test on the target application using the subset of the set of candidate test configurations that is selected based on the selection variable, while refraining from iterating the test on the target application using any candidate test configuration that is not selected based on the selection variable.

16. The medium of claim 1, wherein the target application comprises at least one of: a software application and a hardware design.

17. The medium of claim 1, wherein the set of parameters comprises at least one of: an operating system, a browser, a communications protocol, a central processing unit, and a database management system.

18. The medium of claim 1, wherein the operations further comprise:

specifying a plurality of coverage variables, wherein each of the plurality of coverage variables respectively corresponds to the set of interactions, and each of the plurality of coverage variables indicates which of the set of candidate test configurations cover the corresponding interaction; and obtaining a cost variable, indicating a cost associated with each of the set of candidate test configurations, wherein executing the target application using a first candidate test configuration, of the set of candidate test configurations, is completed in a shorter duration of time than executing the target application using a second candidate test configuration, of the set of candidate test configurations, and a first cost associated with the first candidate test configuration is less than a second cost associated with the second candidate test configuration;

specifying the set of one or more constraints comprises:

requiring that the dot product of (a) the selection variable and (b) each of the plurality of coverage variables be equal to or greater than one;

minimizing the dot product of (a) the selection variable and (b) the cost variable;

the constraint solver comprises at least one of: a constraint programming solver and a mathematical programming solver;

the set of candidate test configurations is only a subset of a complete set of candidate test configurations that covers every possible combination of candidate values for the set of parameters;

the set of candidate test configurations includes a particular test configuration, and the plurality of coverage variables indicates that the particular test configuration covers every interaction;

the target application comprises at least one of: a software application and a hardware design;
the set of parameters comprises at least one of: an operating system, a browser, a communications protocol, a central processing unit, and a database management system;
the operations further comprise:
applying the data model to the constraint solver;
subsequent to applying the data model to the constraint solver:
selecting one or more additional candidate test configurations, which were not included in the set of candidate test configurations, based on a column generation method; and
storing a new data model, applicable to the constraint solver, based on both (a) the set of candidate test configurations and (b) the additional candidate test configurations, the new data model including a new selection variable;
applying the new data model to the constraint solver;
iterating a test on the target application using a subset of the set of candidate test configurations that is selected based on the new selection variable.

19. A system comprising:
at least one device including a hardware processor;
the system being configured to perform a set of operations comprising:
identifying a set of test parameters for testing a target application;
identifying, for each test parameter of the set of test parameters, a respective set of candidate values for the test parameter;
identifying a set of candidate test configurations, each associated with a respective combination of candidate values for the set of test parameters;
identifying a desired coverage strength;
identifying subgroups of test parameters, from the set of test parameters, each of the subgroups of test parameters including a number of test parameters that is equal to the desired coverage strength;
identifying a set of interactions, wherein:
each interaction is associated with one of the subgroups of test parameters;
each interaction is associated with a respective combination of candidate values for the associated subgroup of test parameters; and
the set of interactions covers every possible combination of candidate values for each of the subgroups of parameters;
specifying a selection variable, indicating which of the set of candidate test configurations have been selected;
specifying a set of one or more constraints that:
minimizes a cost of testing the target application using a subset of the set of candidate test configurations that is selected based on the selection variable; and
requires each of the set of interactions to be covered by at least one of the subset of the set of candidate test configurations that is selected based on the selection variable;
storing a data model, applicable to a constraint solver, comprising:
the selection variable; and
the set of constraints;
wherein the target application is executed using at least one of the subset of the set of candidate test configurations that is selected based on the selection variable.

20. A method comprising:
identifying a set of test parameters for testing a target application;
identifying, for each test parameter of the set of test parameters, a respective set of candidate values for the test parameter;
identifying a set of candidate test configurations, each associated with a respective combination of candidate values for the set of test parameters;
identifying a desired coverage strength;
identifying subgroups of test parameters, from the set of test parameters, each of the subgroups of test parameters including a number of test parameters that is equal to the desired coverage strength;
identifying a set of interactions, wherein:
each interaction is associated with one of the subgroups of test parameters;
each interaction is associated with a respective combination of candidate values for the associated subgroup of test parameters; and
the set of interactions covers every possible combination of candidate values for each of the subgroups of parameters;
specifying a selection variable, indicating which of the set of candidate test configurations have been selected;
specifying a set of one or more constraints that:
minimizes a cost of testing the target application using a subset of the set of candidate test configurations that is selected based on the selection variable; and
requires each of the set of interactions to be covered by at least one of the subset of the set of candidate test configurations that is selected based on the selection variable;
storing a data model, applicable to a constraint solver, comprising:
the selection variable; and
the set of constraints;
wherein the target application is executed using at least one of the subset of the set of candidate test configurations that is selected based on the selection variable;
wherein the method is performed by at least one device including a hardware processor.

* * * * *

UNITED STATES PATENT AND TRADEMARK OFFICE
CERTIFICATE OF CORRECTION

PATENT NO. : 10,248,550 B2
APPLICATION NO. : 15/715145
DATED : April 2, 2019
INVENTOR(S) : Kadioglu et al.

It is certified that error appears in the above-identified patent and that said Letters Patent is hereby corrected as shown below:

In the Specification

In Column 13, Line 61, delete "appying" and insert -- applying --, therefor.

In Column 14, Line 16, delete "algoirthm" and insert -- algorithm --, therefor.

Signed and Sealed this
Third Day of November, 2020

Andrei Iancu
*Director of the United States Patent and Trademark Office*